United States Patent [19]

Rast

[11] 4,402,136
[45] Sep. 6, 1983

[54] DEVICE FOR CUTTING PIPES

[75] Inventor: Wlodzimierz Rast, North Adelaide, Australia

[73] Assignee: Rast Patent Manufacturers Pty. Limited, North Plympton, Australia

[21] Appl. No.: 247,535

[22] PCT Filed: Jul. 18, 1980

[86] PCT No.: PCT/AU80/00035

§ 371 Date: Mar. 17, 1981

§ 102(e) Date: Mar. 17, 1981

[87] PCT Pub. No.: WO81/00225

PCT. Pub. Date: Feb. 5, 1981

[30] Foreign Application Priority Data

Jul. 18, 1979 [AU] Australia .............................. PD9625

[51] Int. Cl.³ ............................................ B23D 21/08
[52] U.S. Cl. ...................................... 30/101; 82/4 C; 82/100
[58] Field of Search ................................ 30/99–102; 82/4 C, 47, 100

[56] References Cited

U.S. PATENT DOCUMENTS

| 1,061,940 | 5/1913 | Hock | 82/100 X |
| 1,279,022 | 9/1918 | Scott | 30/96 |
| 2,162,210 | 6/1939 | Alston | 30/101 X |
| 2,379,177 | 6/1945 | Pavey | 30/101 X |
| 2,567,833 | 9/1951 | Warren et al. | 30/97 |
| 2,735,175 | 2/1956 | Tallman | 30/101 X |
| 3,290,779 | 12/1966 | Bridges et al. | 30/101 X |
| 4,063,355 | 12/1977 | Netzel | 30/101 X |
| 4,126,064 | 11/1978 | Tarrant | 82/47 X |

FOREIGN PATENT DOCUMENTS 2284423 4/1976 France .............................. 30/101

Primary Examiner—James M. Meister
Attorney, Agent, or Firm—Robert E. Burns; Emmanuel J. Lobato; Bruce L. Adams

[57] ABSTRACT

A pipe cutter for cutting pipes of plastic material. The pipe cutter has a clamp (2) for clamping the pipe and the clamp carries a saddle (9) which is rotatable about the clamp. A radially adjustable cutter (16) is mounted on the saddle (9) so that as the saddle (9) is rotated the pipe is cut. The cutter 16 is spring-loaded to accommodate for deflection of the pipe during cutting.

5 Claims, 4 Drawing Figures

DEVICE FOR CUTTING PIPES

This invention relates to a device for cutting and/or shaping pipes and particularly relates to the cutting of plastic pipes although the invention is not necessarily limited thereto, and this invention has particular reference to the mounting of the cutters and the use of cutters of particular type which will be later described herein.

BACKGROUND OF THE INVENTION

Pipes occur in very many sizes and larger sizes may be difficult to cut if an accurate end to the pipe is to be achieved.

Such cutting is usually done by a saw, either manually or mechanically, and difficulty occurs particularly where a pipe must be cut and perhaps the end shaped on a site.

It is an object of the present invention to provide a pipe cutting and shaping tool which can be used on various pipe diameters and can be used in the field in a simple and effective manner.

BRIEF DESCRIPTION OF THE INVENTION

The device according to this invention comprises a split yoke adapted to be engaged on the pipe to be cut or shaped and locked thereto and on the yoke, a movable saddle which can move around on the yoke for the full circumference of the pipe and which carries a cutting tool and means whereby the saddle can be moved around on the yoke and includes means for adjusting the depth of cut and the position of cut.

The operation of the device is to clamp the yoke to the pipe adjacent to where it is to be cut and to then engage the cutting tool and then move the saddle around on the split yoke so that the cutting tool penetrates and channels the pipe, this action continuing with the cutting tool being fed in until the pipe has been cut and the cut portion severed from the main part of the pipe.

DESCRIPTION OF THE PREFERRED EMBODIMENT

Figure 1:
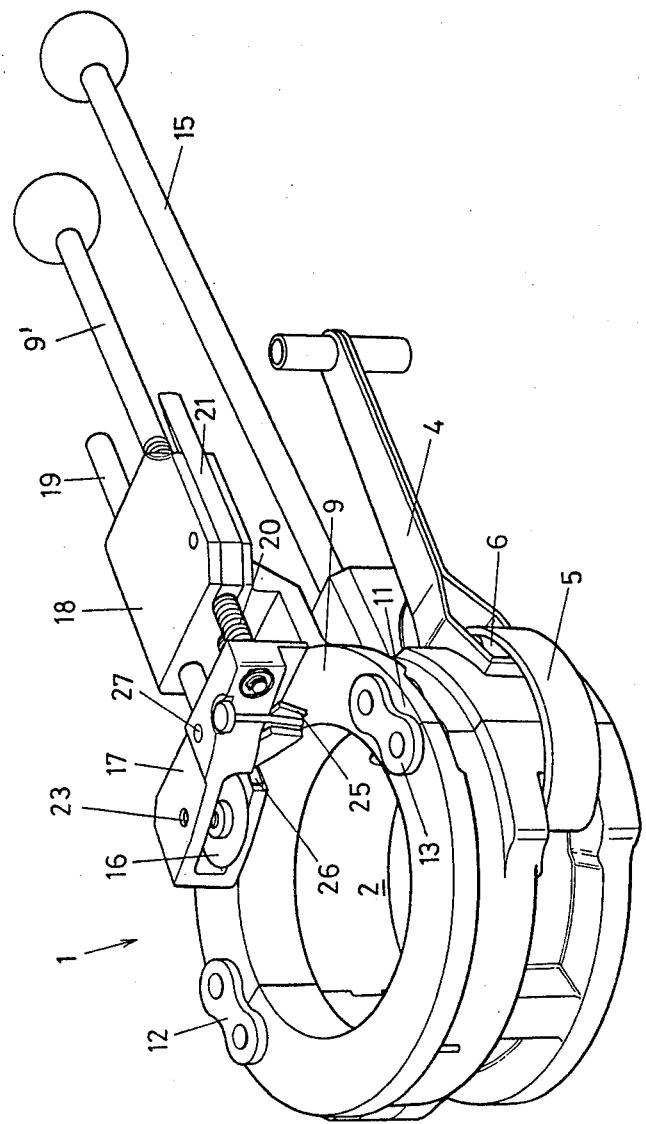
FIG. 1 is a perspective view of the pipe cutter.
Figure 2:
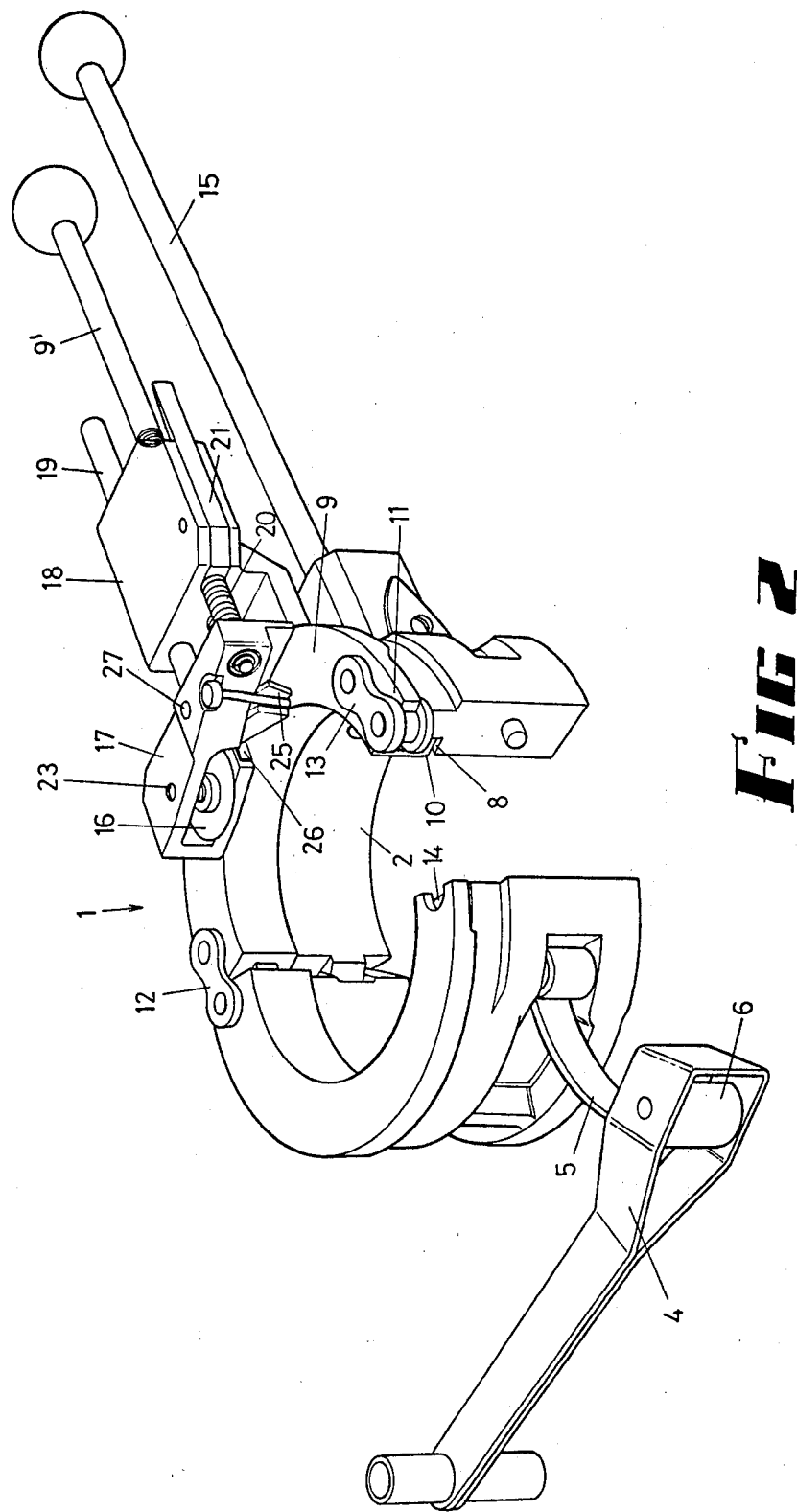
FIG. 2 is a perspective view of the pipe cutter in the open position.

The pipe cutter 1 has a split yoke 2 formed in two parts hinged together by a hinge pin 3 and provided with a tensioning or locking lever 4 at the other end to draw the ends together and to hold them when the yoke is tightened on to the pipe. The locking lever 4 is hinged to a spring strip 5 pivoted to one part, the lever 4 having a roller 6 to engage in a recess 7 in the other part. The split yoke 2 can have inserts which can be placed between the split yoke 2 and the pipe to allow different sizes of the pipe to be cut by the one device, the inserts being either loose members fitted into position or members fitted to the split yoke which can be displaced to make the yoke applicable when closed to pipes of different size, the inserts preferably being provided with means to locate them correctly on the split yoke.

The yoke parts are so shaped that a runway 8 is formed which can be engaged by a saddle 9 to guide the saddle on the yoke 2, and the saddle itself is of circular form to fit into the split yoke and is split to extend fully around the split yoke. The saddle is either provided with a handle 9' whereby it can be manually moved around on the yoke or it can be driven by means of a motor or power applied from a drill or the like, and for this purpose the yoke can have a toothed section on it engaged by a pinion on the saddle whereby the saddle will be driven around the yoke.

Both the saddle 9 and the yoke 2 are centrally split to open out to be engageable on the pipe, the two parts of each being hinged together so that when correctly positioned the two parts can open out together to encircle the pipe and then be closed together so that the saddle can rotate about the axis of the yoke. The yoke 2 has an internal groove or slot 8 which comprises the runway, and the saddle is generally U-shaped with one leg 10 engaging in the slot 8, the other leg 11 extending over the end face of the yoke 2 so that the saddle is carried in the shaped groove or track 8 in the yoke to retain it in position on the yoke, the hinges of each being so arranged that the hinges operate about a common axis when the parts are correctly located, or as shown the saddle 9 can have a chain line 12 between its two parts, the chain link being pivoted to each. Similarly the open ends are joined by a chain link 13, this link being pivoted to one part, while the other has a recess 14 to engage the end of the link 13. Thus registration can readily be achieved by having a handle 15 on the yoke 2 which registers with the handle 9 when the hinges are in registry.

The tool 16 is adjustably mounted on the saddle 9 and preferably is a rotary cutting wheel, the tool being mounted in a tool support 17 which is slidable radially in relation to the saddle and split yoke in a support 18 on the saddle and preferably connected to a guide 19 and to the handle 9' which extends outwardly through the support 18 and which is provided with adjustment means for adjusting the cutting depth of the tool such as by having the handle rotational with threads 20 to move inwards as the cut progresses but with the arrangement such that the tool remains correctly at its cutting angle.

The tool support 17 can be positioned so that the wheel 16 is at the required extension from the saddle where it can operate on different sized pipes, and the thread 20 holds the tool support 17 in any selected position by engaging a spring located latch 21 acting as a form of ratchet, so that rapid adjustment can be made by pushing on the handle 9' while the fine adjustment of the cutting tool can be achieved by rotating the handle as the handle is pulled around to drive the saddle around the yoke to channel the pipe. The spring loaded latch is released by pressing on the latch to allow rapid withdrawal of the tool.

The yoke is provided with the handle 15 which extends outwardly to allow the operator to grasp the handle while manipulating the movable handle 9', or alternatively the yoke could be fitted with two handles or support members or a single handle or support member with a ground plate so arranged that when a pipe is engaged in the split yoke, one end of the pipe can rest on the ground and the other will be elevated in that the split yoke will be elevated and supported from the ground by the fixed handle or similar assembly, this then allowing the moving handle to move the saddle around but keeping that handle clear of the ground.

Figure 4:
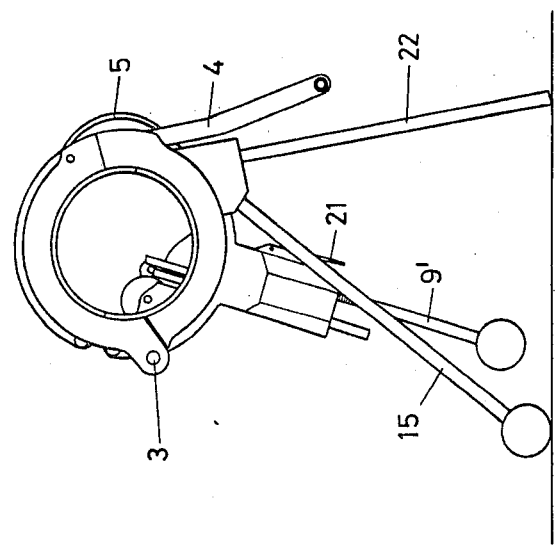
FIG. 4 is a view of the pipe cutter standing on its legs.
Figure 3:
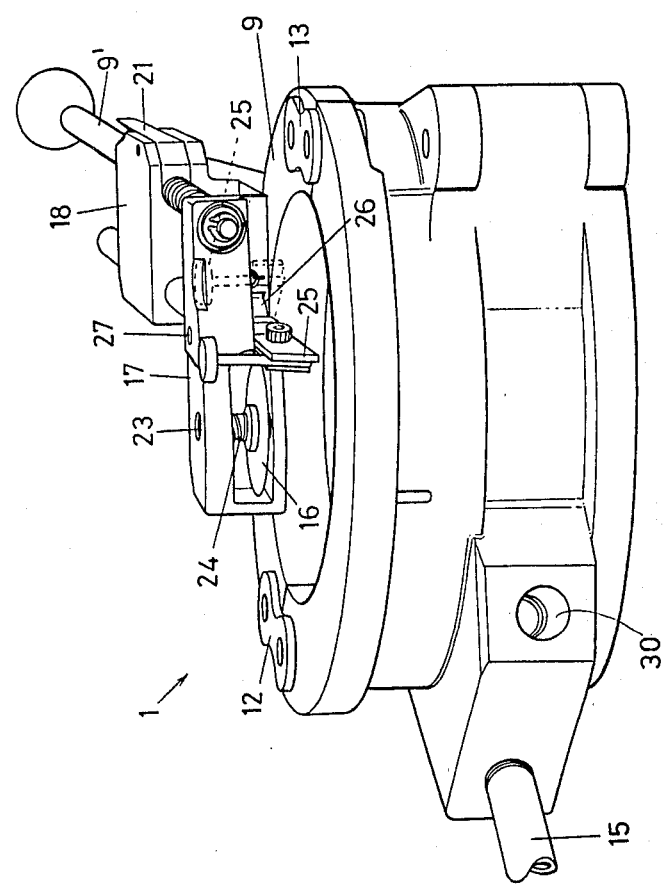
FIG. 3 is a further perspective view of the pipe cutter.

Alternatively, the handles can be replaced by other means and for instance the handle which is used to move the saddle around on the yoke can be omitted and a power drive supplied for the saddle to move it around on the yoke, or both a power drive and a handle can be provided, means being however necessary which will ensure that the tool is fed into its work as it cuts the pipe. As staged earlier herein, the handles can be used to index the position of the saddle relative to the yoke to align the hinge of one with the hinge of the other to allow the yoke and saddle to be opened out to be engaged on a pipe. Adjustment means can be provided on the saddle to take up wear, such as adjusting screws or shims between the two edges as the halves close. Handle 15 is preferably hollow, and can be unscrewed to expose a fixed rod or further handle 22, the handle 15 then being repositioned in a further socket 30 to form a pair of legs as shown in FIG. 4.

The means for feeding the tool into the pipe as it is moved around the pipe to cut or shape it can be conveniently effected by a lead thread which moves the tool inwards having on it an indexing device such as a member having projecting fingers which engage pins on the yoke as the carriage is moved around on the yoke, and by making the pins variable in their position such as to give a greater or lesser space between them the ratio of feed can be varied. As shown this feeding of the tool can take place by manually rotating the handle 9' as desired.

The cutting tool can be replaced by a motorized cutter in the form of a router having a shaped face which can first be caused to penetrate the pipe which is to be cut or shaped and can then be moved around to cut the pipe by rotating the carriage on the yoke, this then allowing a required shaping of the cut ends of the pipe to be achieved in a simple manner by having a cutter of the required form.

As stated earlier the yoke can be provided with means whereby the diameter can be adjusted such as by having cam faces on the parts of the yoke operating in conjunction with movable inserts which allows the movable inserts to be engaged on the pipe to position the yoke at a required distance from the pipe consistent with its diameter and the tool can then simply be fed into its initial cutting position by means of any form of adjustment which may if required be independent of the feed of the tool during its cutting operation, thus allowing the tool to be prepositioned to suit a pipe of a particular diameter and to then be fed by means of the indexing device or manually or by other means as the carriage moves around on the yoke.

It will be realized that plastic pipes for which the device is particularly suitable, but not limited thereto, are normally distortable and may not be perfectly round in cross-section but it will be realized that by having a yoke which is accurately shaped and which can be pulled down firmly onto the pipe, that the yoke will serve as a means for holding the pipe accurately so that the cutter can operate in an effective manner whether it to be a simple cutting tool or a shaping tool or a driven member such as a router.

A problem which occurs with cutters used in connection with this type of apparatus is that the cutters tend to be heavily stressed because of distortion of material being cut and according to this invention, therefore, special forms of cutters are envisaged, or special mounting of such cutters occurs which will remove the problems resulting from distortion of the pipes as they are being cut even though they are firmly held in a clamp adjacent to the area where the cutting is to take place.

To understand the problem it is necessary to appreciate that when a cutter is forced into a pipe whether it be of a parting tool type or a rotating type wheel cutter, the pipe is stressed inwards by the action of the cutter and although the pipe is held in a clamp, some inward distortion of the pipe takes place with the result that after cutting, the pipe returns to its undistorted shape and the cutter therefore would tend to cut a slightly uneven end on such a pipe, which unevenness may be barely noticeable but at the same time also because of this effect there is a tendency to stress the cutter itself and in the case of a wheel cutter to distort or break the cutter due to such stress.

The stress which occurs is largely a sideways stress on the cutter and it has been found that by allowing the cutter to move somewhat in a lateral direction, that is in a direction parallel to the axis of the pipe being cut, the stress on the cutter is relieved and a better and more accurate cut results.

The invention can be carried in to effect in various ways but according to one form, the circular cutter wheel 16 is mounted to rotate on a shaft 23 which is held during operation to be substantially parallel to the axis of the pipe, which shaft 23 allows limited axial movement of the cutter 16 on the shaft but is spring-loaded by a spring 24 in such a way that the cutter wheel 16 is urged against a stop to allow the cutter wheel 16 to move slightly on the shaft against this spring 24 to accommodate itself correctly in a cut which is progressively being made as the cutter is moved around the pipe to effect the cut.

The wheel cutter thus consists of a wheel mounted on a shaft with a stop to prevent the cutter moving towards the yoke but allowing it to move outwardly axially on the shaft against a loading which urges it to remain at the inward position.

The wheel cutter can be replaced by a parting tool type of cutter which again will be mounted so that it is urged into one cutting position but can move outwards somewhat from this position against loading applied against the cutter so that when a cut is being made, the cutter can follow a groove which is formed by the cutter in its initial starting operation and as the cutter is moved around the pipe during a cutting action the cutter can accommodate itself to the groove formed and continue to cut along the groove until that part of the pipe being cut off from the main body of the pipe is severed.

Instead of using a single cutter it is possible to use a plurality of cutters and, for instance, a cutter may be used which chamfers the pipe before a wheel cutter is positioned to continue the cut, and in such an arrangement the cutters can be mounted on a support lock which is in turn mounted on a shaft which engages the saddle which moves around on the split yoke and is provided with the feed mechanism to feed the cutters inwards as a cut is made as the saddle moves around on the split yoke.

A cutter 25 which acts to provide a chamfer is mounted on the support block 17 in a position substantially axial in relation to the shaft and this cutter is arranged so that it can move from a cutting position to a position where it is out of action (shown by dotted line), which can conveniently be achieved by mounting the cutter on a holder which is mounted on a pivot 27 on the support block so that it can be substantially coextensive with the shaft but can be folded down to be out of the cutting position, a spring blade 26 normally holding the cutter in either its cutting or its folded location. The cutter 25 has a cutting edge shaped to produce the chamfer by having its cutting edge at the required angle relative to the axis of the pipe to be cut.

The actual shape of the cutters can be considerably varied and, for instance, in the case of the parting tool type or the type which forms a groove which is later cut by a second cutter, the tool can have a symmetrical point on it which cuts the groove, that is the point is arranged symmetrically about a central axis of the cutter and this can either be of a gradual taper or of a steep taper according to what is required. Instead of having a symmetrical cutter, the cutter could for instance have a first section which is shaped as a parting tool which will sever the pipe but biased in one direction and extending upon the first section on the other side can be a second portion which makes a shaping cut such as a bevel on the cut end at the outer part of the cut.

Thus the tool can have an axial face joining a sloping face on one side of the centre line of the tube and a sloping face of a different shape on the other side of the centre line but commencing at the point where the first surface ends.

By mounting the cutters on a support block on a shaft which can be provided with the feed mechanism to feed the cutters into actuation as the saddle moves around on the split yoke, a simple and effective arrangement is achieved which can have either a single or plurality of cutters and which can allow some lateral movement of the cutter where this is required but it will be realized that different methods of support of the cutters are possible and the invention is not to be limited to the form just described. For instance the saddle could have on it a first cutter which is fixed to form a groove initially to guide the main cutter or this can be movable so that it can have upward displacement against a loading force if that is required to counter the distortion which occurs in a pipe as it is being cut as previously described, and a final cutter can be used on the saddle somewhat remote from the first bevelling or shaping cutter which again can be provided with lateral movement against an urging force tending to hold it in a preselected position.

The cutters can be lubricated by a wick or other device, and the cutters can have a sharpener arranged to allow ready sharpening in the case of wheel cutters to maintain the required edge as the cutters rotate.

It will be realized from the foregoing that a simple and effective device results from this invention which can be simply attached to a pipe at an area where a cut is to be made and by driving the saddle around on the split yoke, a cutting and/or shaping tool carried by the saddle will channel or groove the pipe to cut the pipe by making one or more passes of the saddle around on the split yoke while feeding in the cutting tool to make the required depth of cut.

The claims defining the invention are as follows:

1. A pipe cutter for cutting pipes of plastics material, said cutter comprising: a split yoke configured to clamp on a pipe to be cut, a saddle guided against one end face of the yoke and movable on the yoke to rotate around the axis of the yoke, and a cutter disposed on a cutter holder mounted on the face of the saddle remote from the said yoke and operable to engage and cut the pipe in the region outside of the said split yoke and the said saddle as the saddle moves around the yoke, said yoke comprising two semicircular parts pivoted to each other at one of their ends, and a clamp to clamp the other ends together whereby a pipe may be inserted into the cutter when the yoke is in the opened position, and said saddle being circular and also formed of two portions, the said saddle having an in-turned flange engageable with an internal circumferential slot in the yoke, said two portions at one of their respective adjacent ends being joined by a connecting link, said link being pivoted to said adjacent ends, said other ends of said portions being engageable by a protuberance on one end engaging in a socket in said other end, whereby when the hinged portions of the yoke and saddle are aligned, said yoke and saddle can be opened and closed simultaneously, and means for rotating the said saddle on the said yoke when the said yoke is in the closed position.

2. A pipe cutter as defined in claim 1; wherein said cutter holder is adjustable radially of the pipe by a handle and guide slidably engaging a support on said yoke, said handle having a screw thread engaging a spring-loaded ratchet whereby the ratchet allows rapid inward movement and rotation of the handle about its longitudinal axis to provide fine depth adjustment, said ratchet being manually released to allow rapid withdrawal of the cutter.

3. A pipe cutter as defined in claim 1; wherein the cutter is a rotary blade cutter mounted on a shaft parallel to the axis of the pipe, said rotary blade cutter being biased by a spring against a stop in a direction to move said cutter towards the yoke, whereby in operation said cutter can move axially of the pipe due to the deflection of the pipe during cutting.

4. A pipe cutter as defined in claim 1; wherein said cutter holder carries a chamfer cutter comprising a blade pivoted to the holder to be swung into a cutting position from a retracted position, said chamfer cutter comprising an angled blade having its cutting edge at an angle to the axis of the pipe so as to produce a chamfer on the cut end of the pipe.

5. A pipe cutter as defined in any one of claims 1, 2, 3 or 4 characterised in that the yoke has a handle, the handle being positioned to be parallel to the handle on the saddle in a position to open the yoke, said handle on the yoke being a sleeve over a leg, whereby the sleeve can be removed and positioned in a socket angularly offset from the leg to provide a stand for the pipe cutter, said handle on the saddle being of lesser length to allow it to move the saddle around the yoke.

* * * * *